(12) United States Patent
Bell

(10) Patent No.: US 11,104,388 B2
(45) Date of Patent: Aug. 31, 2021

(54) TRAILER INCLUDING INSULATED FLOOR

(71) Applicant: Strick Trailers, LLC, Fairless Hills, PA (US)

(72) Inventor: Justin L. Bell, New Haven, IN (US)

(73) Assignee: Strick Trailers, LLC, Fairless Hills, PA (US)

(*) Notice: Subject to any disclaimer, the term of this patent is extended or adjusted under 35 U.S.C. 154(b) by 80 days.

(21) Appl. No.: 16/706,523

(22) Filed: Dec. 6, 2019

(65) Prior Publication Data

US 2021/0171121 A1  Jun. 10, 2021

(51) Int. Cl.
| | |
|---|---|
| *B62D 25/20* | (2006.01) |
| *B62D 27/06* | (2006.01) |
| *B62D 29/00* | (2006.01) |
| *B62D 29/02* | (2006.01) |
| *B32B 21/08* | (2006.01) |
| *B32B 3/14* | (2006.01) |
| *B32B 27/36* | (2006.01) |

(52) U.S. Cl.
CPC .......... *B62D 25/2054* (2013.01); *B32B 3/14* (2013.01); *B32B 21/08* (2013.01); *B32B 27/36* (2013.01); *B62D 27/065* (2013.01); *B62D 29/005* (2013.01); *B62D 29/02* (2013.01); *B32B 2307/304* (2013.01); *B32B 2471/00* (2013.01)

(58) Field of Classification Search
CPC .. B62D 25/2054; B62D 29/02; B62D 27/065; B62D 29/005; B32B 2307/304; B32B 2471/00; B32B 27/36; B32B 3/14; B32B 21/08

USPC ...................................................... 296/193.07
See application file for complete search history.

(56) References Cited

U.S. PATENT DOCUMENTS

| | | | | |
|---|---|---|---|---|
| 4,151,802 | A * | 5/1979 | Miller | B62D 33/046 105/423 |
| 5,403,063 | A * | 4/1995 | Sjostedt | B62D 25/2054 105/422 |
| 5,772,276 | A * | 6/1998 | Fetz | B62D 25/2054 296/181.2 |
| 7,748,172 | B2 * | 7/2010 | Zupancich | B61D 27/0081 52/55 |
| 9,676,549 | B2 * | 6/2017 | Adams | B65D 88/744 |
| 9,919,835 | B2 * | 3/2018 | Brisendine | B65D 19/38 |
| 2014/0182241 | A1 | 7/2014 | Seo | |
| 2015/0239507 | A1 * | 8/2015 | Padmanabhan | B32B 7/12 296/184.1 |
| 2017/0239916 | A1 * | 8/2017 | Lewit | B32B 27/20 |
| 2020/0001967 | A1 * | 1/2020 | Pirner | B32B 5/245 |
| 2021/0086483 | A1 * | 3/2021 | McCloud | C09J 167/00 |

* cited by examiner

*Primary Examiner* — Pinel E Romain
(74) *Attorney, Agent, or Firm* — Keith Swedo

(57) ABSTRACT

A thermally insulated floor for a trailer includes a layer of parallel support beams. Each support beam is oriented in a direction substantially perpendicular to a forward direction of the trailer. A substantially planar panel of thermally insulating material is disposed on and supported by the layer of parallel support beams. A substantially planar layer of wood is disposed on and supported by the panel of thermally insulating material. The support beams, the panel of thermally insulating material, and the layer of wood are secured together.

20 Claims, 3 Drawing Sheets

TRAILER INCLUDING INSULATED FLOOR

BACKGROUND

The present invention relates to a trailer, container, or other transport vehicle and, more particularly, to a thermally insulated floor of such a trailer, container or transport vehicle (referred to as a "trailer" hereinafter). The interior of a trailer is often refrigerated to keep perishable food cold, or heated to prevent certain products such as beverages and paints from being damaged from freezing.

A problem is that trailers are typically not well insulated, which adds to the heating and cooling cost. Although the floor of the trailer is sometimes insulated using foam insulation, the foam insulation is inserted between support beams, which requires the entire insulated floor assembly to be pre-assembled before being brought into the trailer. Such pre-assembled insulated floors are heavy, bulky, and difficult to move into the interior of the trailer for installation therein. U.S. Patent Pub. No. 20140182241 (Seo) discloses an insulated floor comprising an upper floor layer, a lower floor layer, an intermediate insulating layer, made of polyurethane foam, and support beams being located between the upper floor layer and the lower floor layer. A problem is that the insulated floor must be pre-assembled before being carried into the trailer for installation.

SUMMARY

The present invention may provide a trailer floor including a layer of composite structure insulation supported by parallel I-beam cross members. The layer of insulation is covered by a layer of wood. The parallel I-beam cross members, the layer of composite structure insulation, and the layer of wood may be separately brought into the trailer and may be separately installed in the trailer.

The invention comprises, in one form thereof, a thermally insulated floor for a trailer, including a layer of parallel support beams. Each support beam is oriented in a direction substantially perpendicular to a forward direction of the trailer. A substantially planar panel of thermally insulating material is disposed on and supported by the layer of parallel support beams. A substantially planar layer of wood is disposed on and supported by the panel of thermally insulating material. The support beams, the panel of thermally insulating material, and the layer of wood are secured together.

The invention comprises, in another form thereof, a method of installing an insulated floor in a trailer, including providing a plurality of parallel support beams supported by a frame of the trailer. A panel of thermal insulation is laid on the support beams while the support beams are being supported by the frame of the trailer. A layer of wood is laid on the panel of thermal insulation while the panel of insulation is laying on the support beams, and while the support beams are being supported by the frame of the trailer. The layer of wood and the panel of thermal insulation are fastened to the support beams while the support beams are being supported by the frame of the trailer.

The invention comprises, in yet another form thereof, a trailer including a layer of parallel support beams supported by a frame. Each support beam is oriented in a direction substantially perpendicular to a longitudinal direction of the trailer. A substantially planar panel of thermally insulating material is disposed on and supported by the layer of parallel support beams. A substantially planar layer of wood is disposed on and supported by the panel of thermally insulating material. Securing means secures together the support beams, the panel of thermally insulating material, and the layer of wood.

An advantage of the present invention is that the various layers of the insulated floor may be separately brought into the trailer and may be separately installed in the trailer, thereby simplifying the trailer manufacturing process.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
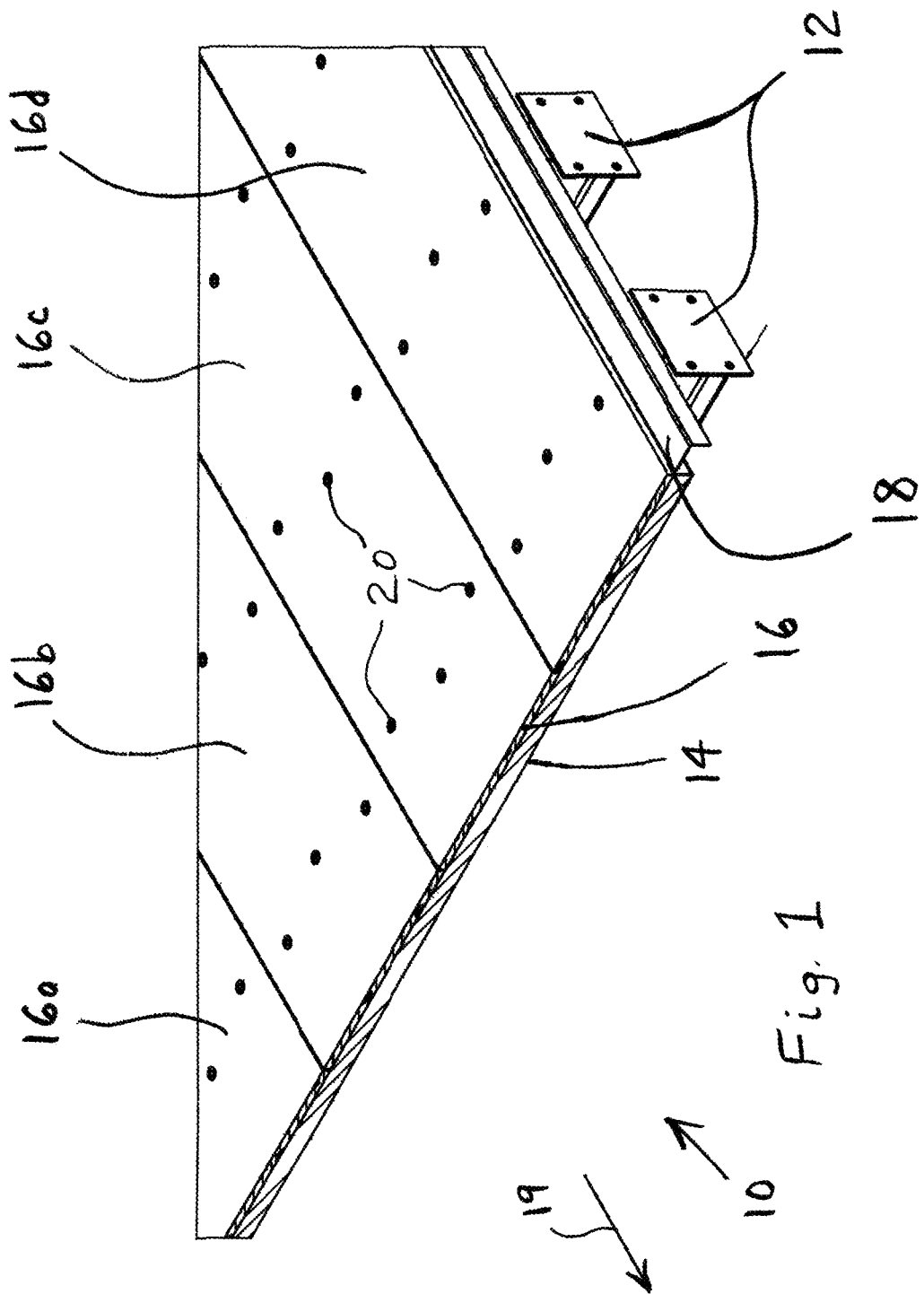
FIG. 1 is a fragmentary perspective view of one embodiment of an insulated floor of the present invention for a trailer.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to the drawings, wherein like numerals indicate like elements, FIG. 1 illustrates one embodiment of an insulated floor 10 of the present invention. Insulated floor 10 includes parallel aluminum I-beams or support beams 12, a panel of polyethylene terephthalate (PET) composite insulation 14, a layer of wood panels 16, and hat section 18. I-beams 12 may extend from one side of the trailer to the opposite side of the trailer. That is, I-beams 12 may be oriented in directions perpendicular to a forward direction 19 in which the trailer normally travels. Forward direction may be parallel to a longitudinal direction of the trailer. I-beams 12 may be supported by a frame (not shown) of the trailer. I-beams 12, in turn, may support insulation panel 14. Insulation panel 14 may support the layer of wood panels 16. Layer of wood panels 16 may include parallel, side-by-side and abutting individual panels or boards, with panels or boards 16a-d being shown in FIG. 1.

In one embodiment, layer of wood panels 16 has a thickness of approximately between three sixteenths inch and three eighths inch, and insulation panel 14 has a thickness of about three eighths inch.

Insulation panel 14 may support the weight of the load that is carried by the trailer and not significantly compress under the weight of the load. For example, the thickness of insulation panel 14 may be compressed less than five percent, or less than two percent, under the weight of the load that is carried by the trailer.

Insulation panel 14 may be in the form of a rigid foam insulation, a foil/paper/foil tri-laminate insulation, trifoil insulation, low-E insulation, low emissivity insulation, or reflective foil insulation.

I-beams 12, insulation 14 and layer of wood panels 16 may be secured together in various ways. Steel screws 20 may attach layer of wood panels 16 to I-beams 12 through insulation 14. Alternatively, nails may be used to attach layer of wood panels 16 to I-beams 12 through insulation 14. As another alternative, adhesive may be used to adhere I-beams 12 to insulation 14 and/or insulation 14 to layer of wood panels 16.

Figure 2:
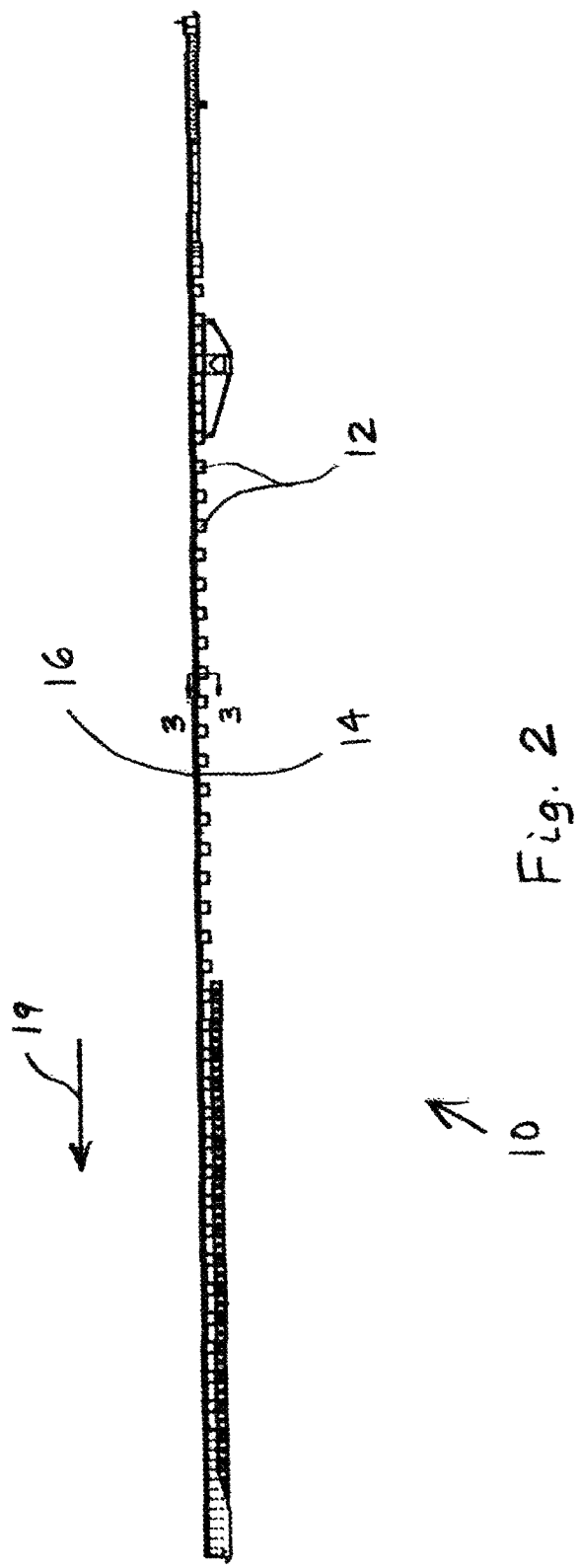
FIG. 2 is a side view of the insulated floor of FIG. 1.
Figure 3:
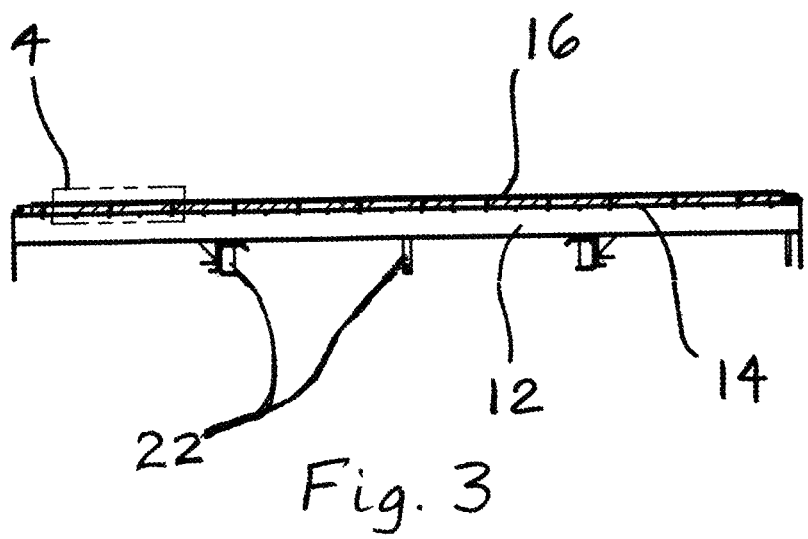
FIG. 3 is a sectional view of the insulated floor of FIG. 2 along line 3-3.
Figure 4:
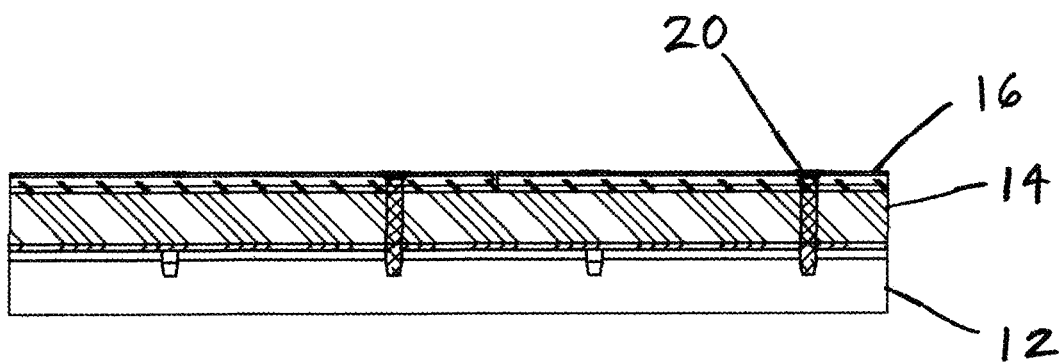
FIG. 4 is an enlarged view of area 4 of FIG. 3.

FIG. 2 illustrates insulated floor 10 of FIG. 1 from a side view. FIG. 3 illustrates insulated floor 10 along line 3-3 of FIG. 2. Portions of a frame 22 of the trailer are shown supporting I-beam 12. FIG. 4 is an enlarged view of area 4 of FIG. 3. The tops of screws 20 may be flush with, or at the same vertical level as, a top surface of layer of wood panels 16. Screws 20 may extend into I-beams 12 to secure layer of wood panels 16 to I-beams 12. Screws 20 may be tapered head screws, and may cut their own thread through I-beams 12.

During manufacture of insulated floor 10, I-beams 12 may be the first components of floor 10 to be installed in the trailer. More particularly, I-beams 12 may be attached to a frame of the trailer.

Next, insulation panel 14 may be laid on top of I-beams 12. Then, individual wood panels may be laid abutting and side-by-side on top of insulation panel 14 to form layer of wood panels 16.

Screws 20 may be inserted through each wood panel, through insulation panel 14, and into an I-beam 12 immediately after the wood panel has been laid down and before the next wood panel is laid down. Alternatively, screws 20 may be inserted only after every one of the wood panels has been laid down on top of insulation panel 14.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A thermally insulated floor for a trailer, the thermally insulated floor comprising:
   a layer of parallel support beams, each said support beam being oriented in a direction substantially perpendicular to a forward direction of the trailer;
   a substantially planar panel of thermally insulating material disposed on and supported by the layer of parallel support beams;
   a substantially planar layer of wood disposed on and supported by the panel of thermally insulating material; and
   means for a securing together the support beams, the panel of thermally insulating material, and the layer of wood.

2. The thermally insulated floor of claim 1 wherein the layer of parallel support beams is configured to be supported by a frame of the trailer.

3. The thermally insulated floor of claim 1 wherein the layer of parallel support beams comprises a layer of parallel aluminum I-beams.

4. The thermally insulated floor of claim 1 wherein the panel of thermally insulating material comprises a panel of polyethylene terephthalate (PET) composite insulation.

5. The thermally insulated floor of claim 1 wherein the panel of thermally insulating material is rigid.

6. The thermally insulated floor of claim 1 wherein the layer of wood comprises a plurality of parallel panels of wood.

7. The thermally insulated floor of claim 1 wherein the securing means comprises a plurality of screws.

8. A method of installing an insulated floor in a trailer, the method comprising:
   providing a plurality of parallel support beams supported by a frame of the trailer;
   laying a panel of thermal insulation on the support beams while the support beams are being supported by the frame of the trailer;
   laying a layer of wood on the panel of thermal insulation while the panel of thermal insulation is laying on the support beams, and while the support beams are being supported by the frame of the trailer; and
   fastening the layer of wood and the panel of insulation to the support beams while the support beams are being supported by the frame of the trailer.

9. The method of claim 8, wherein the parallel support beams are spaced apart.

10. The method of claim 8 wherein the support beams comprise aluminum I-beams.

11. The method of claim 8 wherein the panel of thermal insulation comprises a panel of polyethylene terephthalate (PET) composite insulation.

12. The method of claim 8 wherein the panel of thermal insulation is rigid.

13. The method of claim 8 wherein the layer of wood comprises a plurality of parallel, abutting panels of wood.

14. The method of claim 8 wherein the layer of wood and the panel of thermal insulation are fastened to the support beams by a plurality of screws.

15. A trailer, comprising:
   a frame;
   a layer of parallel support beams supported by the frame, each said support beam being oriented in a direction substantially perpendicular to a longitudinal direction of the trailer;
   a substantially planar panel of thermally insulating material disposed on and supported by the layer of parallel support beams;
   a substantially planar layer of wood disposed on and supported by the panel of thermally insulating material; and
   means for a securing together the support beams, the panel of thermally insulating material, and the layer of wood.

16. The trailer of claim 15 wherein the layer of parallel support beams comprises a layer of parallel aluminum I-beams.

17. The trailer of claim 15 wherein the panel of thermally insulating material comprises a panel of polyethylene terephthalate (PET) composite insulation.

18. The trailer of claim 15 wherein the panel of thermally insulating material is rigid.

19. The trailer of claim 15 wherein the layer of wood comprises a plurality of parallel panels of wood.

20. The trailer of claim 15 wherein the securing means comprises a plurality of screws.

\* \* \* \* \*